United States Patent
Sekiya

(10) Patent No.: US 11,072,042 B2
(45) Date of Patent: Jul. 27, 2021

(54) WAFER AND WAFER PRODUCING METHOD

(71) Applicant: DISCO CORPORATION, Tokyo (JP)

(72) Inventor: Kazuma Sekiya, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 26 days.

(21) Appl. No.: 16/739,454

(22) Filed: Jan. 10, 2020

(65) Prior Publication Data
US 2020/0223015 A1 Jul. 16, 2020

(30) Foreign Application Priority Data

Jan. 15, 2019 (JP) .............................. JP2019-004169

(51) Int. Cl.
*B23K 26/53* (2014.01)
*B28D 1/32* (2006.01)
*B28D 5/00* (2006.01)

(52) U.S. Cl.
CPC .............. *B23K 26/53* (2015.10); *B28D 1/327* (2013.01); *B28D 5/0011* (2013.01)

(58) Field of Classification Search
CPC ........ B23K 26/53; B23K 26/00; B28D 1/327; H01L 21/32115; H01L 21/0445; H01L 21/68742; H01L 29/1608
See application file for complete search history.

(56) References Cited

U.S. PATENT DOCUMENTS

| 10,755,946 | B2* | 8/2020 | Hirata | B23K 26/53 |
| 2019/0006212 | A1* | 1/2019 | Iizuka | B23K 26/60 |
| 2019/0030651 | A1* | 1/2019 | Sekiya | B23K 26/0869 |
| 2019/0039187 | A1* | 2/2019 | Sekiya | C30B 33/00 |
| 2019/0304769 | A1* | 10/2019 | Hirata | B23K 26/53 |
| 2020/0343139 | A1* | 10/2020 | Wei | H01L 21/78 |
| 2021/0121988 | A1* | 4/2021 | Hirata | B23K 26/38 |

FOREIGN PATENT DOCUMENTS

| JP | 2000094221 A | 4/2000 |
| JP | 2016111143 A | 6/2016 |

* cited by examiner

*Primary Examiner* — Seahvosh Nikmanesh
(74) *Attorney, Agent, or Firm* — Greer Burns & Crain Ltd.

(57) ABSTRACT

A wafer producing method includes a peel-off layer forming step of applying a laser beam of a wavelength passing through a hexagonal single crystal ingot with a focal point of the laser beam positioned at a depth corresponding to a thickness of a wafer to be produced from an end face of the hexagonal single crystal ingot to form a peel-off layer, a production history forming step of applying a laser beam of a wavelength passing through the wafer with a focal point of the laser beam positioned inside the wafer at a position corresponding to each of a plurality of devices to be formed on a front surface of the wafer to form a production history, and a wafer peeling step of peeling off the wafer from the hexagonal single crystal ingot.

3 Claims, 4 Drawing Sheets

B-B

WAFER AND WAFER PRODUCING METHOD

BACKGROUND OF THE INVENTION

Field of the Invention

The present invention relates to a wafer produced from a hexagonal single crystal ingot and a wafer producing method of producing a wafer from a hexagonal single crystal ingot.

Description of the Related Art

A functional layer is formed on a front side of a wafer formed of silicon, sapphire, or the like as a base material, and the front side of the wafer is partitioned into respective regions along a plurality of crossing division lines, so that a plurality of devices such as integrated circuits (ICs), large-scale integrations (LSIs), and light emitting diodes (LEDs) are individually formed in the regions of the functional layer on the front side of the wafer. The wafer has been processed along the division lines by a cutting apparatus and a laser processing apparatus to be divided into individual device chips, and the device chips thus obtained are used in electric equipment such as mobile phones and personal computers.

Also, power devices or optical devices such as LEDs are individually formed in a plurality of regions of a functional layer stacked on a front side of a wafer formed of a hexagonal single crystal silicon carbide (SiC) as a base material and partitioned along a plurality of crossing division lines. The wafer with the devices formed therein is generally produced by slicing a semiconductor ingot with a wire saw, and finished by polishing the front and back surfaces of the sliced wafer to be mirror-polished (for example, see Japanese Patent Laid-open No. 2000-094221).

Further, the present applicant has proposed a technique in which a focal point of a laser beam of a wavelength passing through a hexagonal single crystal SiC is positioned inside an SiC ingot to form a separation layer on a cut surface and then separate a wafer from the SiC ingot (see Japanese Patent Laid-open No. 2016-111143).

SUMMARY OF THE INVENTION

Meanwhile, in the wafer producing method described above, regarding the hexagonal single crystal ingot, the wafer produced from the hexagonal single crystal ingot, and the devices manufactured from the wafer, relation among them in each production history is not clear. In particular, in a case in which a defect occurs in a device in the course of manufacturing the device from the wafer, a cause of the defect may not be sufficiently investigated tracing the production history of the defective device.

Such a problem may occur not only in the technique of producing a wafer from a hexagonal single crystal ingot through laser processing as described in Japanese Patent Laid-open No. 2016-111143, but also in the case of producing a wafer by slicing a semiconductor ingot with a wire or the case of producing a wafer by slicing a semiconductor ingot with an inner diameter blade.

It is therefore an object of the present invention to provide a wafer and a wafer producing method which are capable of reliably tracing a production history of a device formed from the wafer produced from a hexagonal single crystal ingot from the device.

In accordance with an aspect of the present invention, there is provided a wafer produced from a hexagonal single crystal ingot, in which a production history is formed by applying a laser beam of a wavelength passing through the wafer with a focal point of the laser beam positioned inside the wafer at a position corresponding to each of a plurality of devices to be formed on a front surface of the wafer.

Preferably, the hexagonal single crystal ingot is a hexagonal single crystal silicon carbide ingot. Preferably, the production history may be formed from any of ASCII (American Standard Code for Information Interchange) code, a two dimensional barcode, a character, and Morse code.

In accordance with another aspect of the present invention, there is provided a wafer producing method of producing a wafer from a hexagonal single crystal ingot, the method including: a peel-off layer forming step of applying a laser beam of a wavelength passing through the hexagonal single crystal ingot with a focal point of the laser beam positioned at a depth corresponding to a thickness of a wafer to be produced from an end face of the hexagonal single crystal ingot to form a peel-off layer; a production history forming step of applying a laser beam of a wavelength passing through the wafer with a focal point of the laser beam positioned inside the wafer at a position corresponding to each of a plurality of devices to be formed on a front surface of the wafer to form a production history; and a wafer peeling step of peeling off the wafer from the hexagonal single crystal ingot at least after the peel-off layer forming step is carried out.

Preferably, the hexagonal single crystal ingot is a hexagonal single crystal silicon carbide ingot, and in the peel-off layer forming step, the laser beam is applied with the focal point of the laser beam positioned at the depth corresponding to the thickness of the wafer to be produced from the end face of the hexagonal single crystal silicon carbide ingot, while the laser beam is relatively moved with respect to the hexagonal single crystal silicon carbide ingot in a direction perpendicular to a direction in which an off angle is formed between the end face and a c-plane with a c-axis inclined by the off angle with respect to a normal line of the end face of the hexagonal single crystal silicon carbide ingot, and the laser beam is index-fed in the direction in which the off angle is formed to form a plurality of separation bands in which silicon carbide is decomposed into silicon and carbon, and a plurality of peel-off bands each of which has a crack extending along the c-plane from each of the separation bands formed therein, to thereby form the peel-off layer. In addition, the production history may be formed from any of ASCII code, a two dimensional barcode, a character, and Morse code.

The wafer according to the present invention has the production history formed therein by being applied with the laser beam of the wavelength passing through the wafer with a focal point of the laser beam positioned inside the wafer at a position corresponding to each of the plurality of devices formed on the front surface of the wafer. Accordingly, even after the plurality of device are formed on the front surface of the wafer and the wafer is divided into individual device chips, it is possible to check the production history tracing the ingot. Even if a defect occurs in a device, it is possible to investigate a cause of the defect tracing the ingot.

According to the wafer producing method of the present invention, even after the plurality of device are formed on the front surface of the wafer and the wafer is divided into individual device chips, it is possible to check the production history tracing the ingot. Even if a defect occurs in a device, it is possible to investigate a cause of the defect tracing the ingot.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1A:
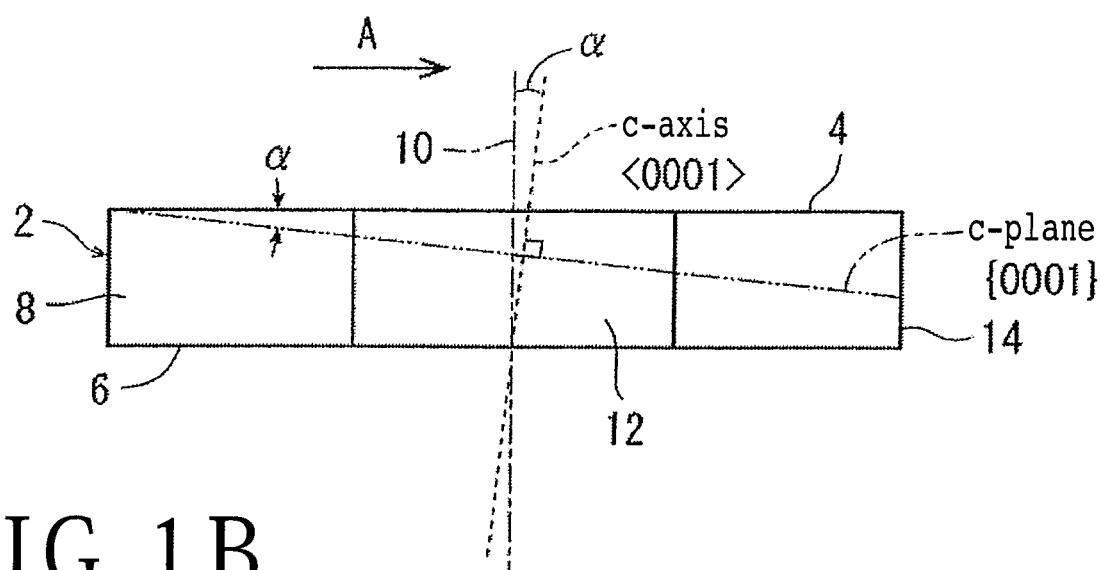
FIG. 1A is a front elevational view illustrating a hexagonal single crystal SiC ingot according to a preferred embodiment of the present invention.
Figure 1B:
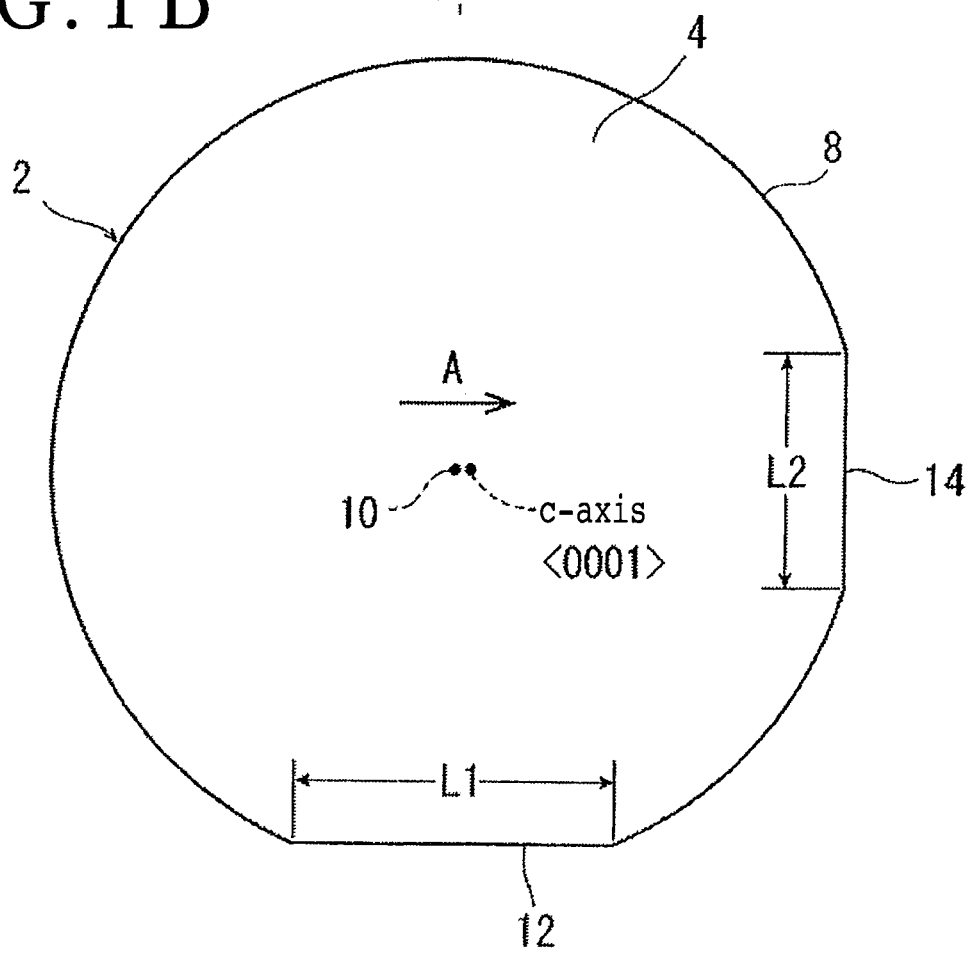
FIG. 1B is a top plan view illustrating the hexagonal single crystal SiC ingot of FIG. 1A.

A wafer and a wafer producing method according to a preferred embodiment of the present invention will be described in detail with reference to the attached drawings. FIGS. 1A and 1B illustrate a hexagonal single crystal ingot (hereinafter, simply referred to as an ingot) 2 according to the preferred embodiment. The ingot 2 is a hexagonal single crystal SiC ingot having a diameter of substantially 100 mm, for example, and formed into a substantially circular column shape as a whole. Moreover, the ingot 2 includes a first end face (upper surface) 4 having a substantially circular shape, a second end face (lower surface) 6 having a substantially circular shape and opposite to the first end face 4, a cylindrical peripheral surface 8 positioned between the first end face 4 and the second end face 6, a c-axis (<0001> direction) extending from the first end face 4 to the second end face 6, and a c-plane ({0001} plane) perpendicular to the c-axis. In the ingot 2, the c-axis is inclined by an off angle α with respect to a normal line 10 of the first end face 4, and the off angle α (for example, a is any of 1°, 3°, or 6°) is formed between the first end face 4 and the c-plane. A direction A in which the off angle α is formed is indicated with an arrow A in FIGS. 1A and 1B.

In addition, on the cylindrical peripheral surface 8 has a first orientation flat 12 and a second orientation flat 14 formed, the first orientation flat 12 and the second orientation flat 14 having a rectangular shape and indicating a crystal orientation of the ingot 2. The first orientation flat 12 is parallel to the direction A in which the off angle α is formed. The second orientation flat 14 is formed in a direction (first direction) perpendicular to the direction A in which the off angle α is formed. As illustrated in FIG. 1B as a top plan view of the ingot 2, when viewed from top, a length L2 of the second orientation flat 14 is set shorter than a length L1 of the first orientation flat 12 (L1>L2). Accordingly, irrespective of the front surface or the back surface of the ingot 2, it is possible to determine an orientation in which the off angle α is formed. Note that the ingot applied to the wafer producing method according to the preferred embodiment of the present invention is not limited to the hexagonal single crystal SiC ingot 2 described above, and may be a hexagonal single crystal ingot where the c-axis is not inclined with respect to the normal line of the first end face and the off angle α formed between the c-plane and the first end face is 0° (specifically, the normal line of the first end face coincides with the c-axis).

When the wafer producing method for obtaining the wafer according to the preferred embodiment is carried out, first, a peel-off layer forming step is carried out in which a laser beam of a wavelength passing through or transmitting through the ingot is applied to the ingot in a state in which a focal point of the laser beam is positioned inside the ingot at a depth corresponding to a thickness of a wafer to be produced and the laser beam is applied thereto to form a peel-off layer. The peel-off layer forming step will be described below with reference to FIGS. 2A and 2B.

Figure 2A:
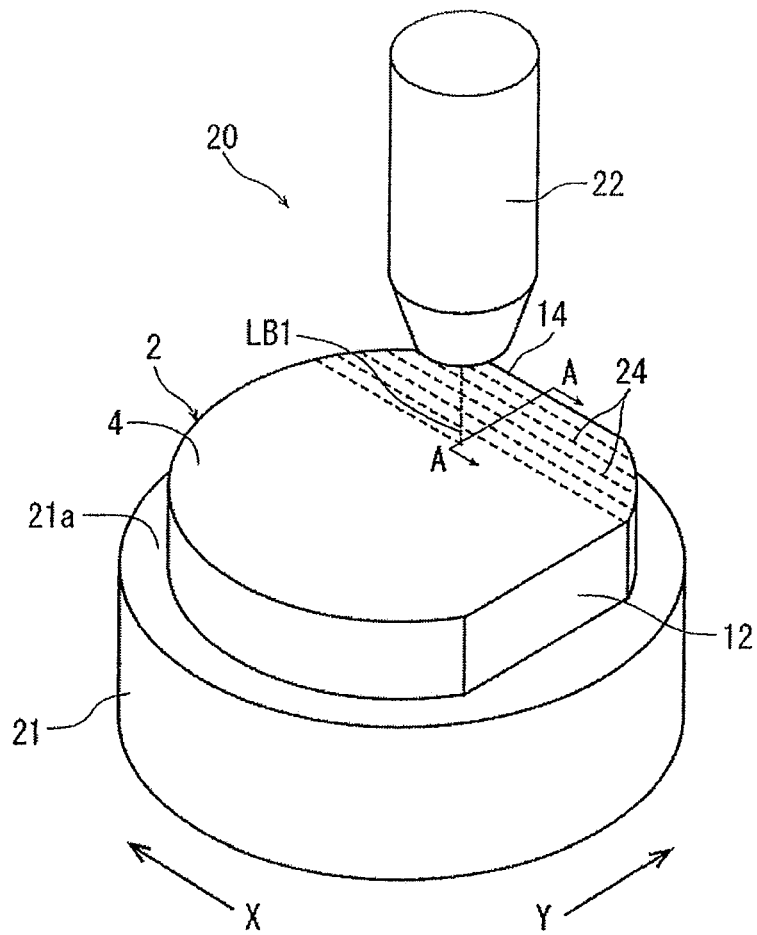
FIG. 2A is a perspective view illustrating a manner of carrying out a peel-off layer forming step of forming a peel-off layer in the hexagonal single crystal ingot in a wafer producing method according to the preferred embodiment of the present invention.

In order to carry out the peel-off layer forming step, first, the ingot 2 is transferred to a laser processing apparatus 20 partially illustrated in FIG. 2A. The ingot 2 transferred to the laser processing apparatus 20 has an adhesive or the like coated on the second end face 6 side and is placed on a flat upper surface 21a of a support table 21 to be held thereon. Note that the first end face 4 of the ingot 2 is processed to be a mirror-finished surface through grinding and polishing in advance to remove irregularities on the first end face 4 of the ingot 2. Also, as needed, it may be configured such that a substrate is arranged on the second end face 6 side of the ingot 2 and the ingot 2 is held under suction on the upper surface 21a of the support table 21 through the substrate.

As illustrated in FIG. 2A, the laser processing apparatus 20 includes focusing means 22 applying a pulsed laser beam LB1 to the ingot 2, in addition to the support table 21 described above. The support table 21 is rotatable about an axis passing through a center of the support table in a radial direction and extending vertically with the axis as a rotation center by a motor for the support table (not illustrated). In addition, the support table 21 is fed in an X-axis direction illustrated with an arrow X in FIG. 2A by an X-axis direction moving mechanism (not illustrated) relatively moving with respect to the focusing means 22. Also, the support table 21 is indexed in a Y-axis direction illustrated with an arrow Y in FIG. 2A by a Y-axis direction moving mechanism (not illustrated) relatively moving with respect to the focusing means 22. The Y-axis direction is perpendicular to the X-axis direction in a horizontal plane. The focusing means 22 includes a condensing lens (not illustrated) focusing a pulsed laser beam LB1 which is emitted from laser beam applying means (not illustrated) of the laser processing apparatus 20 and an output power or the like of which is adjusted, and applying the pulsed laser beam LB1 to the ingot 2.

In order to form a peel-off layer 28 in the ingot 2 held on the support table 21, an imaging unit (not illustrated) provided in the laser processing apparatus 20 images the ingot 2 from the first end face 4 side of the ingot 2. Then, on the basis of the first orientation flat 12 and the second orientation flat 14 determined in accordance with an image of the ingot 2 captured by the imaging unit, the support table 21 is rotated while being moved by the X-axis direction moving mechanism and the Y-axis direction moving mechanism, and the orientation of the ingot 2 is adjusted to a predetermined orientation, so that a position between the ingot 2 and the focusing means 22 in an X-Y plane is adjusted.

Figure 2B:
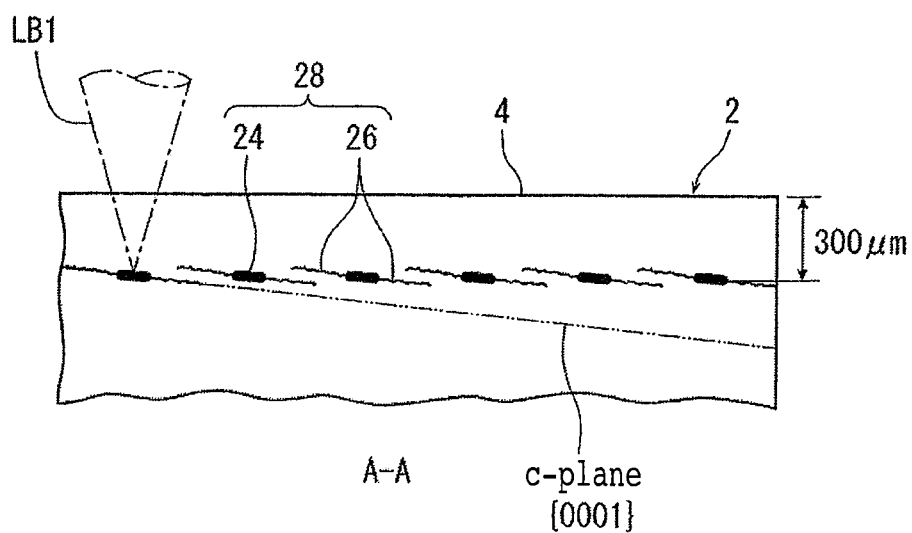
FIG. 2B is a cross-sectional view of the hexagonal single crystal ingot taken along A-A line in FIG. 2A.

When the orientation of the ingot 2 is adjusted to a predetermined orientation, as illustrated in FIG. 2A, the second orientation flat 14 is aligned with the X-axis direction, so that the direction perpendicular to the direction A in which the off angle α is formed is aligned with the X-axis direction and the direction A in which the off angle α is formed is aligned with the Y-axis direction. Subsequently, focal point position adjusting means (not illustrated) causes the focusing means 22 to move in the vertical direction, thereby positioning the focal point at a depth corresponding to a thickness of a wafer to be produced (for example, 300 μm) from the first end face 4 of the ingot 2 as illustrated in FIG. 2B. Then, while causing the support table 21 to move at a predetermined feeding speed in the X-axis direction aligned with the direction (the first direction) perpendicular to the direction A in which the off angle α is formed, laser processing is carried out by applying the pulsed laser beam LB1 of a wavelength passing through SiC constituting the ingot 2 to the ingot 2 from the focusing means 22, thereby forming a separation band 24.

With application of the pulsed laser beam LB1, SiC constituting the ingot 2 is decomposed into silicon (Si) and carbon (C), and then, the pulsed laser beam LB1 next applied is absorbed into C which has been formed earlier, thereby obtaining the separation band 24. The separation band 24 is continuously formed in the direction (the first direction) perpendicular to the direction A in which the off angle α is formed by feeding the support table 21 in the X-axis direction. Along with this formation of the separation band 24, a crack extends from the separation band 24 isotropically along the c-plane to form a peel-off band 26 at a predetermined width. Note that, when the laser processing of forming the separation band 24 described above is carried out, instead of moving the support table 21, the focusing means 22 side may be moved in the X-axis direction at a predetermined feeding speed.

After the separation band 24 and the peel-off band 26 are formed inside the ingot 2 in the first direction, the Y-axis direction moving mechanism is operated to index-feed the support table 21 in the Y-axis direction along the direction A in which the off angle α is formed by a predetermined index amount (for example, 250 to 400 μm) at which the ingot 2 and the focal point of the pulsed laser beam LB1 are set in a range not exceeding a predetermined width at which the above-described peel-off band 26 is formed. In this manner, the laser processing and index-feeding which are described above are repeated, so that the separation band 24 and the peel-off band 26 in which the crack extends isotropically from the separation band 24 along the c-plane are sequentially formed at an interval of a predetermined index amount in the direction A in which the off angle α is formed. In this embodiment, the c-axis is inclined with respect to the normal line of the first end face 4 of the hexagonal single crystal SiC ingot 2 to form the off angle α between the first end face 4 and the c-plane, and it may be configured such that adjacent ones of the peel-off bands 26 in the direction A in which the off angle α is formed overlap with each other in the vertical direction as viewed from top or bottom. Thus, the peel-off layer 28 which includes a plurality of the separation bands 24 and a plurality of the peel-off bands 26 and which has a lowered strength in order to peel off a wafer from the ingot 2 is preferably formed at a depth corresponding to a thickness of a wafer to be produced from the first end face 4 of the ingot 2.

Note that laser processing conditions in forming the peel-off layer 28 described above are set below, for example.
Wavelength: 1064 nm
Repetition frequency: 80 kHz
Average output power: 2 W
Pulse width: 10 ns
Spot diameter: 3 μm
Numerical aperture (NA) of the focusing lens: 0.43
Index amount: 250 to 400 μm
Feed speed: 120 to 260 mm/sec
Position of the focal point: 300 μm from the end face (upper surface) 4 of the ingot 2

As described above, the peel-off layer forming step is carried out, and the ingot 2 formed with the peel-off layer 28 at a depth corresponding to a thickness of a wafer to be produced can be obtained. After the peel-off layer forming step described above is carried out and the ingot 2 formed with the peel-off layer 28 can be obtained, a production history forming step is next carried out in which a focal point of a pulsed laser beam of a wavelength passing through a wafer to be produced from the ingot 2 is positioned inside a position corresponding to each of a plurality of devices to be formed on a front surface of the wafer to form a production history. A detailed description thereof will be given below with reference to FIGS. 3A and 3B.

Figure 3A:
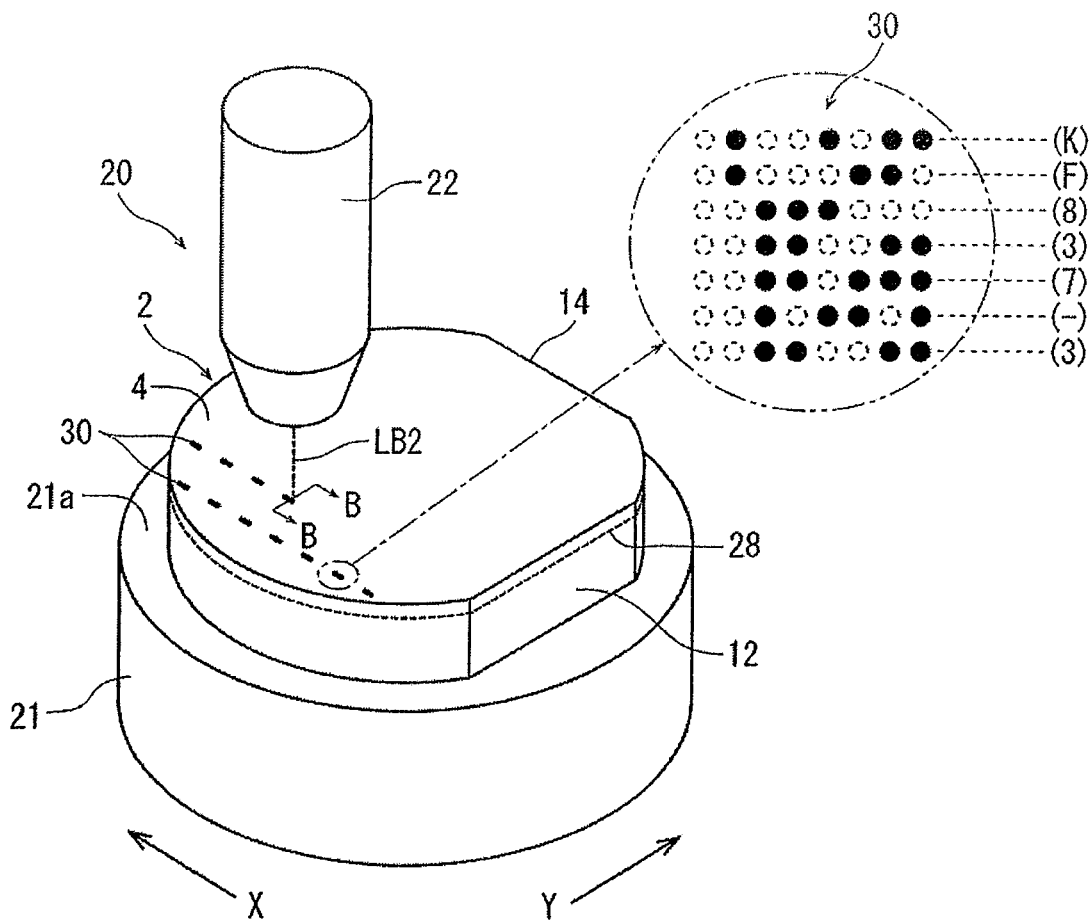
FIG. 3A is a perspective view illustrating a manner of carrying out a production history forming step of forming a production history in the hexagonal single crystal ingot in the wafer producing method.

In the present embodiment, it is assumed that the production history forming step which will be described below is carried out by use of the laser processing apparatus 20 which has carried out the peel-off layer forming step described above. As illustrated in FIG. 3A, on the basis of the first orientation flat 12 and the second orientation flat 14 which have been determined by the imaging unit (not illustrated) in the peel-off layer forming step which has been carried out earlier, the support table 21 is rotated while being moved by the X-axis direction moving mechanism and the Y-axis direction moving mechanism, and the orientation of the ingot 2 is adjusted to a predetermined orientation, so that a position between the ingot 2 and the focusing means 22 in an X-Y plane is adjusted.

Figure 3B:
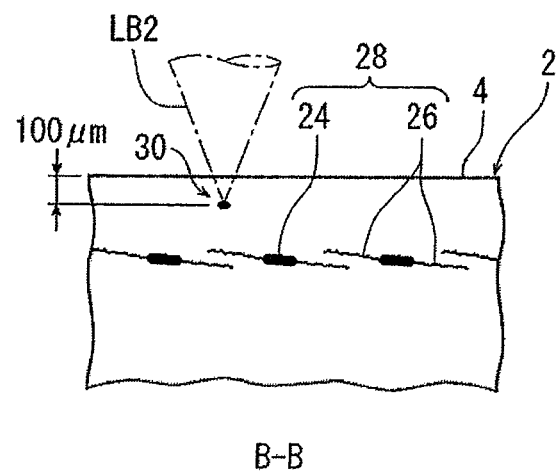
FIG. 3B is a cross-sectional view of the hexagonal single crystal ingot taken along B-B line in FIG. 3A.

When the orientation of the ingot 2 is adjusted to a predetermined orientation, as illustrated in FIG. 3A, the second orientation flat 14 is aligned with the X-axis direction, so that the direction perpendicular to the direction A in which the off angle α is formed is aligned with the X-axis direction and the direction A in which the off angle α is formed is aligned with the Y-axis direction. Subsequently, focal point position adjusting means causes the focusing means 22 to move in the vertical direction, thereby positioning the focal point at a depth corresponding to a position inside a wafer in which a production history is to be formed (for example, 100 μm) from the first end face 4 of the ingot 2 as illustrated in FIG. 3B. Note that, after the wafer is produced from the ingot 2, the depth corresponding to the position inside the wafer in which this production history is to be formed is set as a region not affected upon grinding and polishing of the back surface of the wafer and forming devices on the front surface of the wafer. Then, while causing the support table 21 to move at a predetermined feeding speed in the X-axis direction aligned with the first direction perpendicular to the direction A in which the off angle α is formed, laser processing is carried out by applying a pulsed laser beam LB2 of a wavelength passing through SiC constituting the ingot 2 to the ingot 2 from the focusing means 22, thereby forming a production history 30. As for the production history 30 to be formed in this production history forming step, a description will be given below in more detail.

Note that laser processing conditions for carrying out the production history forming step are changed as follows, from the laser processing conditions under which the peel-off layer forming step has been carried out in such a way as to form a laser mark at a focusing position and not to form a crack.

Wavelength: 1064 nm
Repetition frequency: 80 kHz
Average output power: 2 W
Pulse width: 10 ns
Spot diameter: 100 μm
Focal length: 150 mm
Numerical aperture (NA) of the focusing lens: 0.3
Position of the focal point: 100 μm from the first end face 4 of the ingot 2

When the pulsed laser beam LB2 is applied to the ingot 2 to form the production history 30 illustrated in FIG. 3A, control means (not illustrated) of the laser processing apparatus 20 stores therein a production history forming position in which the production history 30 is formed, the production history forming position corresponding to a position in which each of a plurality of devices is to be formed on a front surface of a wafer to be formed from the ingot 2. Then, the pulsed laser beam LB2 of a wavelength passing through the wafer is applied such that the focal point thereof is positioned inside the wafer at the position in which each of the plurality of devices is to be formed on the front surface of the wafer to be formed from the ingot 2, i.e., at the production history forming position described above.

As understood from FIG. 3B which is a cross-sectional view taken along the B-B line of FIG. 3A, application of the pulsed laser beam LB2 forms a modified portion in which SiC constituting the ingot 2 is decomposed into Si and C, as a laser mark. As illustrated in FIG. 3A, the laser mark is formed in a region defined at a predetermined position and in a predetermined direction according to an 8-bit ASCII code, for example, so that the production history 30 represented as "KF837-3" is formed, for example. The production history 30 expressed according to the ASCII code represents a processing method for producing a wafer, a symbol specific to the ingot, a number specific to a wafer produced from the ingot, a position of a device on a wafer, or the like. Thus, even when the wafer produced is divided into individual device chips, it is possible to check the production history 30 which has been formed so as to correspond to each device.

Figure 5:
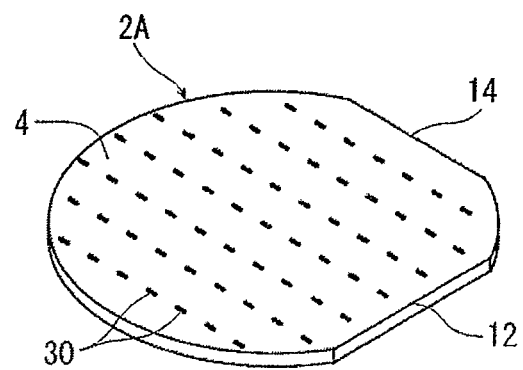
FIG. 5 is a perspective view of a wafer produced according to the preferred embodiment of the present invention.

As described above, after the peel-off forming step of forming the peel-off layer 28 in the ingot 2 and the production history forming step of forming the production history 30 are finished, an external force is applied to the ingot 2 to separate a plate-like member from the ingot 2 with the peel-off layer 28 as a start point of separation, the plate-like member having a thickness corresponding to a thickness of a wafer to be produced, and a wafer peeling step of producing a wafer 2A illustrated in FIG. 5 is carried out.

Figure 4:
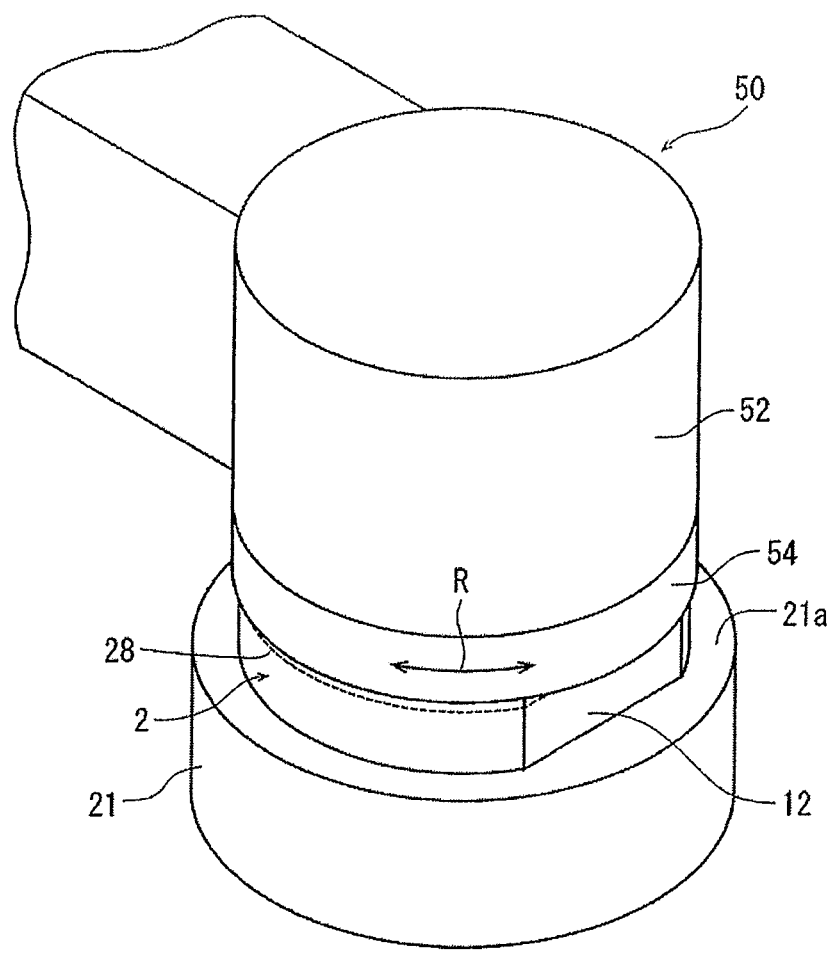
FIG. 4 is a perspective view illustrating a manner of carrying out a wafer peeling step in the wafer producing method.

This wafer peeling step is carried out by use of a pressing mechanism 50 partially illustrated in FIG. 4, for example. The pressing mechanism 50 can be disposed in the laser processing apparatus 20 and includes a head 52 moving in the vertical direction by a moving mechanism (not illustrated) incorporated in the laser processing apparatus 20, and a pressing member 54 being rotated with respect to the head 52 in a direction indicated with an arrow R.

As illustrated in FIG. 4, the pressing mechanism 50 is positioned above the ingot 2 fixed to the support table 21, and the head 52 is lowered until the pressing member 54 is in pressure contact with the first end face 4 of the ingot 2.

When the pressing member 54 is rotated in the direction indicated with the arrow R in a state in which the pressing member 54 is in pressure contact with the first end face 4 of the ingot 2, a torsional stress occurs in the ingot 2, and the ingot 2 is fractured at the peel-off layer 28, so that the wafer 2A can be separated from the ingot 2. As illustrated in FIG. 5, in the wafer 2A, the production history 30 has been formed by positioning the focal point of the laser beam (pulsed laser beam LB2 described above) of a wavelength passing through the wafer 2A inside a position corresponding to each of a plurality of devices formed on the front surface of the wafer 2A. Accordingly, even after a plurality of devices are then formed on the front surface of the wafer 2A and the wafer 2A is divided into individual device chips, it is possible to check the production history tracing the ingot. Even if a defect occurs in a device, it is possible to investigate a cause of the defect tracing the ingot. After the wafer 2A is separated from the ingot 2, the separated surface (lower surface side) of the wafer 2A and the separated surface of the ingot 2 are preferably polished to a mirror-finished surface.

According to the present invention, the embodiment described above is not limitative, and various modifications are provided. For example, in the foregoing embodiment, there has been provided an example in which the ingot 2 is a hexagonal single crystal SiC ingot in which the c-axis is inclined with respect to the normal line 10 of the first end face 4 of the ingot 2 and the off angle α (for example, α is any of 1°, 3°, or 6°) is formed between the first end face 4 and the c-plane. However, the present invention is not limited to this, and the ingot 2 may be another ingot not formed with an off angle α between the first end face 4 and the c-plane. In this case, there is no need to decide a feeding direction upon carrying out the peel-off layer forming step and an indexing direction on the basis of the off angle α, and a given direction of the ingot is positioned along the X-axis direction, so that laser processing can be carried out.

Moreover, in the foregoing embodiment, the wafer peeling step is carried out after the peel-off layer forming step and the production history forming step are carried out. However, the present invention is not limited to this, and it is possible to carry out the production history forming step after the peel-off layer forming step and the wafer peeling step are carried out in this order. Further, in the foregoing embodiment, the feeding direction of the support table 21 at the time of carrying out the production history forming step is made to align with the feeding direction of the support table 21 at the time of carrying out the peel-off layer forming step. However, the production history forming step is not intended for forming a crack from a laser mark. Thus, a moving direction of the support table 21 at the time of carrying out the production history forming step is not necessarily made to align with the moving direction of the support table 21 at the time of carrying out the peel-off layer forming step, and can be set to a different feeding direction.

Further, in the foregoing embodiment, the peel-off layer forming step and the production history forming step are carried out with the same laser processing apparatus 20. However, the present invention is not limited to this, and the peel-off layer forming step and the production history forming step may be carried out by separate laser processing apparatuses. Further, in the foregoing embodiment, the production history 30 is formed with the 8-bit ASCII code.

However, the present invention is not limited to this, and the production history 30 can be also formed on the basis of a two dimensional barcode, a character, Morse code, or the like.

Further, in the foregoing embodiment, there has been provided an example in which a wafer to which the present invention is applied is produced by forming the peel-off layer in the ingot through laser irradiation to the ingot and peeling the wafer from the ingot with the peel-off layer as a start point of separation. However, a wafer producing method according to the present invention is not limited to this, and for example, is applicable also to a wafer produced by slicing the ingot with a wire saw, an inner diameter blade, or the like. In this case, planarization of the upper surface of the ingot is required before laser irradiation for forming the production history.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A wafer producing method of producing a wafer from a hexagonal single crystal ingot, the method comprising:
  a peel-off layer forming step of applying a laser beam of a wavelength passing through the hexagonal single crystal ingot with a focal point of the laser beam positioned at a depth corresponding to a thickness of a wafer to be produced from an end face of the hexagonal single crystal ingot to form a peel-off layer;
  a production history forming step of applying a laser beam of a wavelength passing through the wafer with a focal point of the laser beam positioned inside the wafer at a position corresponding to each of a plurality of devices to be formed on a front surface of the wafer to form a production history; and
  a wafer peeling step of peeling off the wafer from the hexagonal single crystal ingot at least after the peel-off layer forming step is carried out.

2. The wafer producing method according to claim 1, wherein the hexagonal single crystal ingot is a hexagonal single crystal silicon carbide ingot, and
  in the peel-off layer forming step, the laser beam is applied with the focal point of the laser beam positioned at the depth corresponding to the thickness of the wafer to be produced from the end face of the hexagonal single crystal silicon carbide ingot, while the laser beam is relatively moved with respect to the hexagonal single crystal silicon carbide ingot in a direction perpendicular to a direction in which an off angle is formed between the end face and a c-plane with a c-axis inclined by the off angle with respect to a normal line of the end face of the hexagonal single crystal silicon carbide ingot, and the laser beam is index-fed in the direction in which the off angle is formed to form a plurality of separation bands in which silicon carbide is decomposed into silicon and carbon, and a plurality of peel-off bands each of which has a crack extending along the c-plane from each of the separation bands formed therein, to thereby form the peel-off layer.

3. The wafer producing method according to claim 1, wherein the production history is selected from the group consisting of American Standard Code for Information Interchange, a two dimensional barcode, a character, and Morse code.

* * * * *